(12) United States Patent
Fisher

(10) Patent No.: US 8,909,379 B2
(45) Date of Patent: Dec. 9, 2014

(54) WINCH CONTROL SYSTEM

(75) Inventor: Scott Fisher, Las Vegas, NV (US)

(73) Assignee: Tait Towers Manufacturing, LLC, Lititz, PA (US)

( * ) Notice: Subject to any disclaimer, the term of this patent is extended or adjusted under 35 U.S.C. 154(b) by 476 days.

(21) Appl. No.: 13/413,841

(22) Filed: Mar. 7, 2012

(65) Prior Publication Data

US 2013/0238135 A1 Sep. 12, 2013

(51) Int. Cl.
*G06F 19/00* (2011.01)
*B66D 1/60* (2006.01)
*B66D 1/54* (2006.01)

(52) U.S. Cl.
CPC .... *B66D 1/60* (2013.01); *B66D 1/54* (2013.01)
USPC .......................................... 700/275; 472/80

(58) Field of Classification Search
CPC .................................. B66D 1/60; B66D 1/54
USPC ............................................ 472/80; 700/275
See application file for complete search history.

(56) References Cited

U.S. PATENT DOCUMENTS

| | | | |
|---|---|---|---|
| 3,476,385 A * | 11/1969 | Foy | 472/80 |
| 3,675,794 A * | 7/1972 | Ingram et al. | 414/138.3 |
| 4,185,520 A * | 1/1980 | Henneman et al. | 475/83 |
| 4,392,187 A | 7/1983 | Bornhorst | |
| 4,448,398 A * | 5/1984 | Wyatt | 254/361 |
| 4,710,819 A | 12/1987 | Brown | |
| 4,947,302 A | 8/1990 | Callahan | |
| 5,209,560 A | 5/1993 | Taylor et al. | |
| 5,769,527 A | 6/1998 | Taylor et al. | |
| 5,920,476 A | 7/1999 | Hennessey et al. | |
| 6,209,852 B1 | 4/2001 | George et al. | |
| 6,297,610 B1 | 10/2001 | Bauer et al. | |
| 6,343,824 B1 * | 2/2002 | Foy | 294/82.35 |
| 6,459,919 B1 | 10/2002 | Lys et al. | |
| 6,600,289 B2 | 7/2003 | George et al. | |
| 6,873,355 B1 | 3/2005 | Thompson et al. | |
| 6,995,682 B1 * | 2/2006 | Chen et al. | 340/12.22 |
| 7,080,824 B1 | 7/2006 | George et al. | |
| 7,080,825 B1 | 7/2006 | George et al. | |
| 7,556,241 B2 * | 7/2009 | Geagan | 254/342 |
| 7,671,547 B2 * | 3/2010 | Addleman | 318/14 |
| 7,789,374 B2 * | 9/2010 | Averill et al. | 254/323 |
| 7,971,856 B2 | 7/2011 | Kochan | |
| 8,768,492 B2 * | 7/2014 | Fisher | 700/61 |
| 2004/0263100 A1 * | 12/2004 | Heravi et al. | 318/280 |

(Continued)

FOREIGN PATENT DOCUMENTS

WO 2011079115 A1 6/2011
WO 2011079122 A1 6/2011

OTHER PUBLICATIONS

XLNT Advanced Technologies Manufacturing BV, User Manual, Cyberhoist CH 1000/500/250 EU/US, Jan. 2009, Version 3, 32 pgs.

(Continued)

*Primary Examiner* — Michael D Masinick

(57) ABSTRACT

A control system is provided for a group of winches in a system. Each motorized winch in the system can have a control board that can process and generate control commands for operation of the winch. The control board can receive inputs from an automation control system and/or the other control boards to be used in the generation of the control commands for the winch.

20 Claims, 4 Drawing Sheets

(56) References Cited

U.S. PATENT DOCUMENTS

| | | |
|---|---|---|
| 2007/0191966 A1* | 8/2007 | Fisher et al. .................. 700/1 |
| 2008/0091280 A1* | 4/2008 | Mayhew ....................... 700/22 |
| 2009/0015426 A1 | 1/2009 | Long et al. |
| 2013/0310951 A1* | 11/2013 | Fisher ............................ 700/2 |
| 2014/0180439 A1* | 6/2014 | Fisher .......................... 700/17 |

OTHER PUBLICATIONS

FTSI Automation, F315/F515 Self-Contained Flying Winches, 2 pages.

* cited by examiner

WINCH CONTROL SYSTEM

BACKGROUND

The application generally relates to winch operation and control. The application relates more specifically to a system for controlling a plurality of motorized winches using a distributed control model wherein each winch can process and generate its own control instructions or motion profiles and can provide safety and system monitoring.

One use of motorized winches is to suspend and move objects, equipment and/or persons above the ground to enhance live performances, such as sporting events or theatrical/religious performances, or to increase the realism of movie or television productions. For example, several motorized winches could be used to suspend and move a person or object in the air during a theatrical performance to give the appearance that the person or object is "flying" through the air. In another example, a camera could be suspended over the playing surface of a sporting event to capture a different aspect of the action occurring on the playing surface.

In both of the previous examples, all of the motorized winches in the system have to work in a coordinated manner to avoid injury to the person or damage to the object or equipment being suspended. A mistimed or improper action by one of the winches could result in the person, object or equipment crashing into the ground or colliding with another object or structure. Currently, the coordinated control of motorized winches is accomplished with control instructions to the motorized winches from a remotely located controller. The remotely located controller can be incorporated with a user interface for the system or can be an intermediate controller, sometimes referred to as a drive rack, a motion controller or a stack, located between the user interface and the motorized winches. The controller generates and provides the individual instructions to the motorized winch, e.g., extend or retract cable commands, cable speed commands or cable distance commands. In addition, the controller can receive feedback information from each motorized winch relating to the operational status of the motorized winches. The controller can provide control instructions to the motorized winches in order to sequence or coordinate the operation of the motorized winches.

One drawback to the centralized control of the motorized winches with the controller is that as the number of winches in a particular flying system increases, the processing power or capability of the controller and the controller's corresponding communication bandwidth has to likewise increase in order to be able to provide the appropriate control instructions to the motorized winches and receive the corresponding feedback from the motorized winches. If the controller cannot process the information and instructions fast enough, the winch system may not perform as expected and/or safety risks could be introduced that could cause damage or injury to both people and property. In addition, all cables, wires and corresponding connection points used in the system have to be connected to the central location.

Therefore, what is needed is a control system for motorized winches that enables the control instructions for each motorized winch to be generated at the winch using a controller incorporated into the winch.

SUMMARY

The present application is directed to a system having a plurality of winches. Each winch of the plurality of winches includes a motor, a cable reel and a control board. The control board includes a microprocessor and a memory device. The memory device stores a computer program executable by the microprocessor to generate a plurality of commands to control operation of the winch. The control board of a first winch of the plurality of winches is operable to generate the plurality of commands to control operation of a second winch of the plurality of winches in response to the failure of the control board of the second winch of the plurality of winches.

The present application is also directed to a winch. The winch includes a motor, a cable reel connected to the motor and a cable. The cable is stored on or released from the cable reel in response to the motor rotating the cable reel. The winch also includes a control board. The control board has a microprocessor and a memory device. The memory device stores a computer algorithm executable by the microprocessor to generate a plurality of commands to control operation of the motor. In one embodiment, the control board can operate the winch as a standalone device, i.e., independent of an automation control system. However, in another embodiment, the control board can operate the winch as a component of an automation control system.

The present application is further directed to a system having an automation control system and a plurality of winches. Each winch of the plurality of winches includes a motor and a control board. The control board has a microprocessor and a memory device. The memory device stores a computer program executable by the microprocessor to generate a plurality of commands to control operation of the motor in response to receiving an operational command from the automation control system. The system also includes a communication network connecting the plurality of winches and the automation control system. The communication network is operable to permit communication between the winches of the plurality of winches and communication between the automation control system and the plurality of winches. The automation control system is operable to permit a transfer of control of a first winch of the plurality of winches with a failed control board to one or more control boards of one or more second winches of the plurality of winches. The one or more control boards of the one or more second winches being operable to receive inputs for the first winch over the computer network and provide control commands to the first winch over the computer network.

One advantage of the present application is the distribution of the control processing load among several controllers to reduce the processing power required of any one controller and enable more cost effective controllers to be used.

Another advantage of the present application is the use of rule functions or groups by a winch controller to respond to an action or event occurring at another winch without receiving an instruction from a central controller.

Still another advantage of the present application is that the winch controller can perform self-monitoring functions with respect to preselected safety and accuracy parameters.

Yet another advantage of the present application is the increased portability of the winch due to the winch controller being contained in the winch.

A further advantage of the present application is the ability of the winch controller to function autonomously without having to receive global control instructions.

An additional advantage of the present application includes the ability of one winch controller to provide control instructions to another winch in the event of a malfunction in that winch's controller.

Other features and advantages of the present application will be apparent from the following more detailed description of the preferred embodiment, taken in conjunction with the accompanying drawings which illustrate, by way of example, the principles of the application.

BRIEF DESCRIPTION OF THE DRAWINGS

Wherever possible, the same reference numbers are used throughout the drawings to refer to the same or like parts.

DETAILED DESCRIPTION OF THE EXEMPLARY EMBODIMENTS

Figure 1:
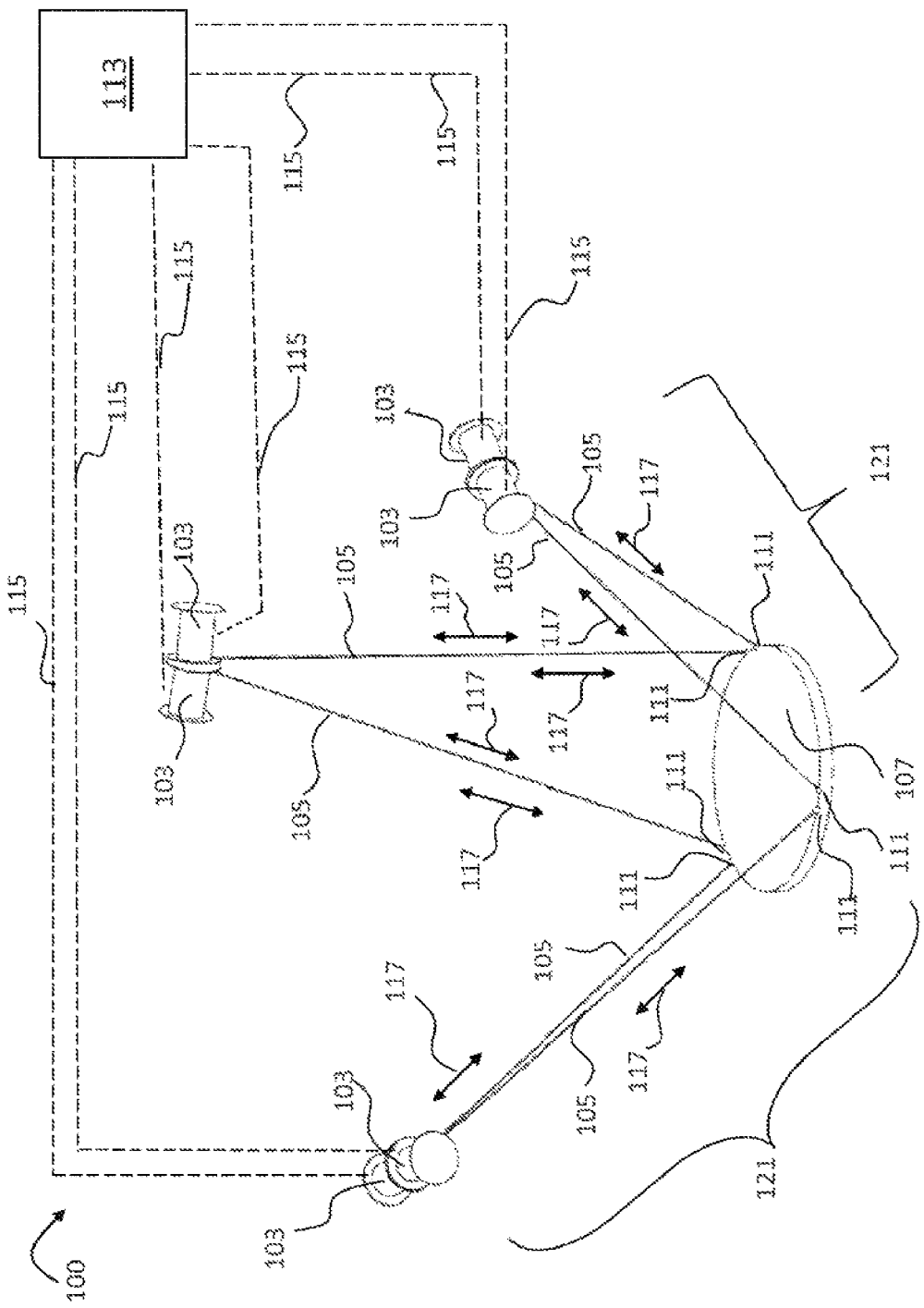
FIG. 1 schematically shows an isometric view of an exemplary embodiment of a suspended flying rig system.

FIG. 1 shows an exemplary embodiment of a suspended flying rig system. The flying rig or aerial movement system 100 has a plurality of winches or winch assemblies 103 connected to a load support 107 by cables 105 extending from each winch 103. Each cable 105 can be connected to the load support 107 at attachment points 111 by any suitable mechanism, such as, loop and closed-hook mechanisms, connectors guided by magnets for alignment, bolts or other fasteners, or cable splices. The load support 107 can be moved, positioned and/or oriented within a three-dimensional working space 121 at least partially defined by the placement of the winches 103. However, movement, positioning and/or orientation of the load support 107 outside the working space 121 may occur if external forces are provided to the load support 107 or actions, such as swinging or cable manipulation, are utilized.

The plurality of winches or winch assemblies 103 can be mounted to one or more suitable support structures, e.g., a truss, a ceiling structure, or a beam, at the location where the flying rig system 100 is to be installed. The winch assemblies 103 can be connected or attached to the support structure by any suitable mechanism or technique, such as, fasteners, interlocking structures, quick-release mechanisms, or semi-permanent attachment devices or techniques, e.g., welds.

In an exemplary embodiment, other structures, in addition to the winches 103, may be utilized to guide and suspend cables 105. For example, structures such as one or more pulleys may be positioned between the winches 103 and the load assembly 107 to guide, support or suspend the cable 105 as it is deployed or retracted by winch assembly 103. In one exemplary embodiment, the one or more pulleys can be mounted to one or more support structures. In another exemplary embodiment, the one or more pulleys may be arranged or positioned within or on tracks or other guides that permit the pulleys to physically move or adjust their corresponding locations to provide dynamic re-sizing and re-shaping of the working space 121. In a further exemplary embodiment, the dimensions of working space 121 may be further altered or adjusted by the placement of the pulleys, the movement of the support structure or the movement of the winch assemblies 103.

Suitable pulleys can include conventional pulley structures or other devices capable of rolling or sliding movement while supporting a cable, wire or rope. In one embodiment, the pulleys can be free-rolling pulleys. However, in another embodiment, a brake, motor or other rotation facilitating or retarding device may be used with the pulleys to provide additional control for positioning the load support 107. When pulleys are used, the location of the winch assembly 103 in relation to the working space 121 can be adjusted or varied to accommodate particular circumstances. In one embodiment, all winch assemblies 103 can be located at ground level. In another embodiment, a portion of the winch assemblies 103 can be mounted at ground level and a portion of the winch assemblies 103 can be mounted on support structures. In yet another exemplary embodiment, the winch assemblies 103 can be consolidated into a single location and the cables 105 extended to one or more pulleys to permit shorter control lines 115 from an automation control system or controller 113.

The load support 107 carries, supports, attaches to or otherwise interacts with a load. In certain exemplary embodiments, the load may include seating and a protective cage. However, the load mountable on or to the load support 107 is not so limited. For example, in other exemplary embodiments, the load may include cameras, equipment, lighting, personnel, ride vehicles, ride cars or other objects that are desirably positioned and/or oriented. The load support 107 can be moved by the selective retraction and deploying of cable 105 by each of the plurality of winch assemblies 103. The retraction or retracting of cable references the drawing, spooling, winding or pulling of cable 105 into a storage area of the winch 103, e.g., winding the cable around a drum or reel, to shorten or decrease the length of cable 105 suspended by winch 103. The deployment or deploying of cable references the releasing, unspooling, unwinding or pushing of cable 105 from a storage area of the winch 103, e.g., unwinding the cable from around a drum or reel, to extend or increase the length of cable 105 suspended by winch 103.

Motion of the load support 107 is facilitated by deploying or retracting cables 105 along pull directions 117. Motions, such as pitch, roll and yaw, can be provided by selectively retracting and deploying cables 105 with winch assemblies 103. The pitch, roll and yaw motions occur as a result of the independent deployment or retraction of the cables 105 which causes independent motion in each of the pull directions 117. The cooperative motion in the pull directions 117 permit a range of motion in a three-dimensional space with at least six degrees of freedom. Other motions, such as lifting or lowering, can be accomplished by selectively retracting or extending cables 105 with winch assemblies 103.

The cable 105 can be an elongate support device capable of supporting weight and being stored and driven on the winch assembly 103. Cable 105 can include any suitable structure such as a wire, rope (including synthetic, wire, hemp and Kevlar), cord, tape, chain, monofilament fishing line or other weight supporting structure. The cable 105 may be made or manufactured from synthetic or non-synthetic material(s) such as metals, polymers, plastics or ceramics. In an exemplary embodiment, the cable 105 can include power or signal wires either integrated into the cable 105 or supplied in conjunction with the cable 105 in order to provide electrical power and/or control signals to the load support 107 or to equipment, e.g., a camera, or other devices present on the load support 107. In one embodiment, the cable(s) 105 can include fiber-optic interiors with a durable exterior (for example, a flexible polymeric coating or a flexible metal coating). In other exemplary embodiments, one or more of the cables 105 can include an aramid fiber (for example, a polyimide fiber) or can be braided Kevlar-jacketed. In another exemplary embodiment, one or more of the cables 105 can be a steel cable of a gauge capable of supporting up to about 600 pounds. However, in other embodiments, the cable 105 can support loads in excess of 600 pounds.

Winch or winch assembly 103 can include a powered winch or other powered device capable of retaining and retracting/deploying cable. In one exemplary embodiment, the winch assembly 103 can include a powered winch having a motor to drive a reel or set of reels which receive, store, drive or otherwise move cable 105. The arrangement of motors and reel can include any suitable arrangement known for powered winches and may include gearing, clutch assemblies, brakes, belts, chains or other structures useful for translating rotation motion from the motor to rotational motion of the reel. In addition, the reel can include a helical groove or similar structure to retain cable 105.

Figure 2:
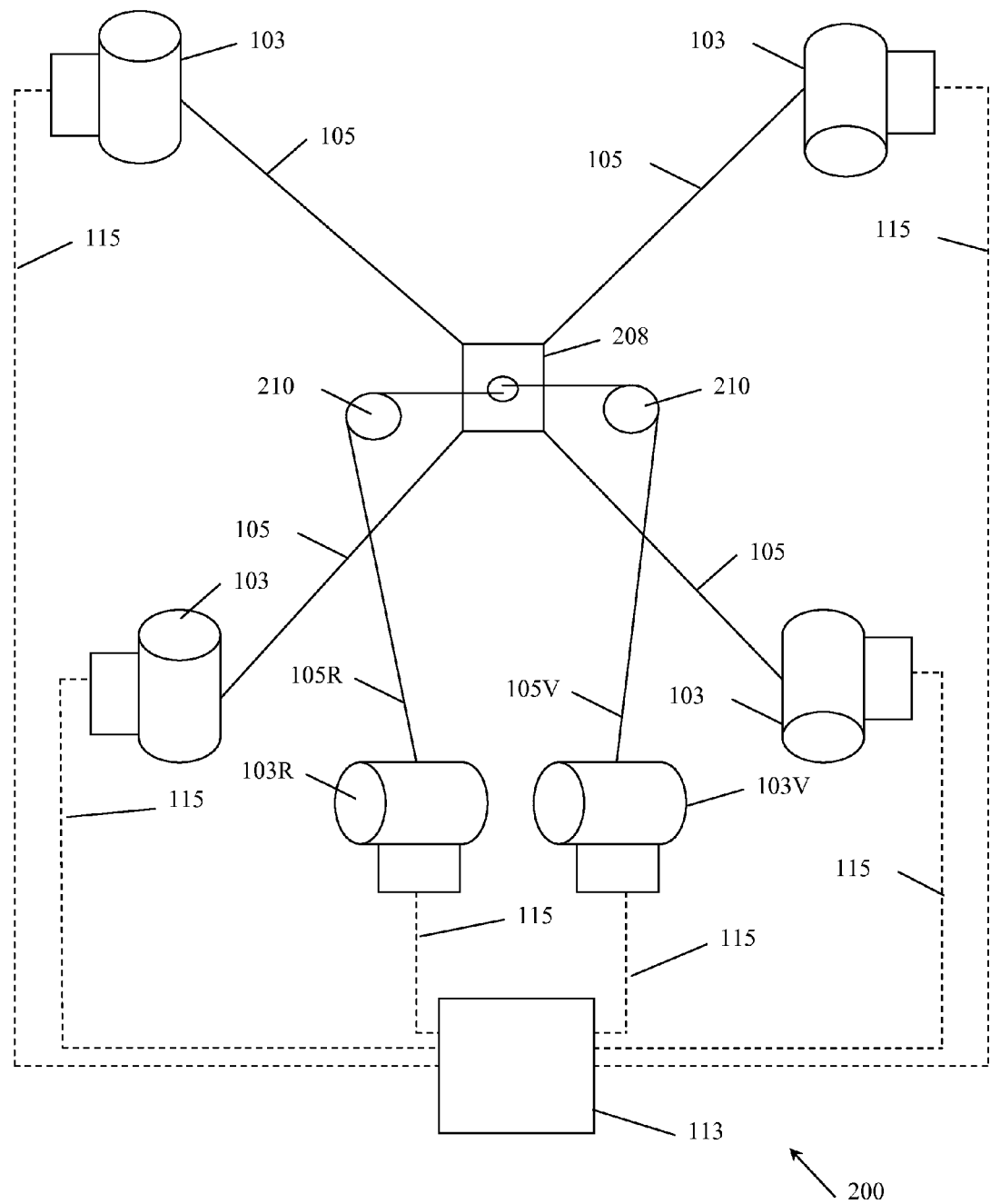
FIG. 2 schematically shows an exemplary embodiment of a second suspended flying rig system.

FIG. 2 shows another exemplary embodiment of a suspended flying rig system. The flying rig or aerial movement system 200 has a plurality of winches or winch assemblies 103 connected to a flying rig, multipoint suspended frame or trolley 208 by cables 105 extending from each winch 103. Each cable 105 can be connected to the frame 208 using attachment mechanisms similar to those previously described for connecting to the load support 107. The winches 103 connected to frame 208 can be positioned and mounted, as previously described, to enable the frame 208 to move in a two-dimensional space at least partially defined by the placement of the winches 103. Connected to the frame 208 can be an object such as a harness to carry a person or a camera. The planar movement of the object, i.e., movement in the two-dimensional space, is controlled by the movement of the frame 208. In other words, the object has the same relative position in the two-dimensional space as the frame 208. For vertical movement or rotational movement of the object connected to the frame 208, two additional winches 103V and 103R can be connected to the object by the use of pulleys 210 and/or other mechanisms. The cables 105V and 105R connected to the additional winches 103V and 103R engage pulleys 210 and are then connected to the object.

In another exemplary embodiment, additional pulleys may be positioned between the winches 103 and the frame 208 and/or the pulleys 210 to guide, support or suspend the cable 105 as it is deployed or retracted by the winch assemblies 103. The pulleys, including pulleys 210, can be mounted or configured as previously discussed and include any suitable pulley structure as previously discussed.

The frame 208 (and connected object) can be moved in the two dimensional space by the selective retraction and deploying of cable 105 by each of the plurality of winch assemblies 103 connected to frame 208. The cooperative motion in the pull directions of the winches connected to the frame 208 permit a range of motion in the two dimensional space. The vertical movement of the object can be obtained by the selective retraction and deployment of cable 105V by the winch 103V connected to the object. Similarly, the rotational movement of the object is obtained by the selective retraction and deployment of cable(s) 105R by the winch(es) 103R connected to the object. In another embodiment, rotation of the object can be obtained from a system of winches located in frame 208.

Figure 3:
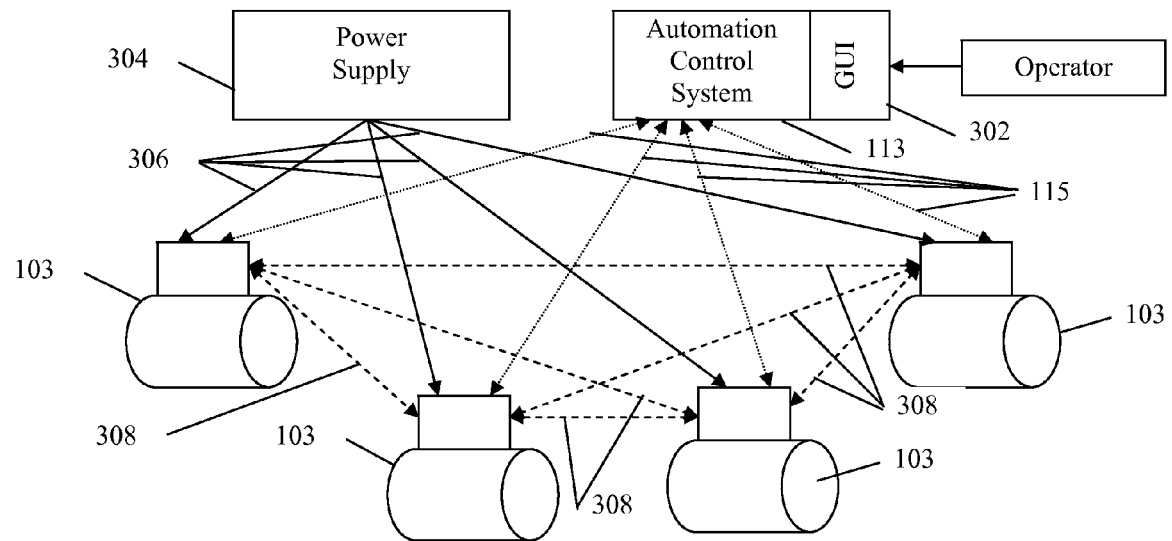
FIG. 3 schematically shows an embodiment of a wiring arrangement for a plurality of winches.
Figure 4:
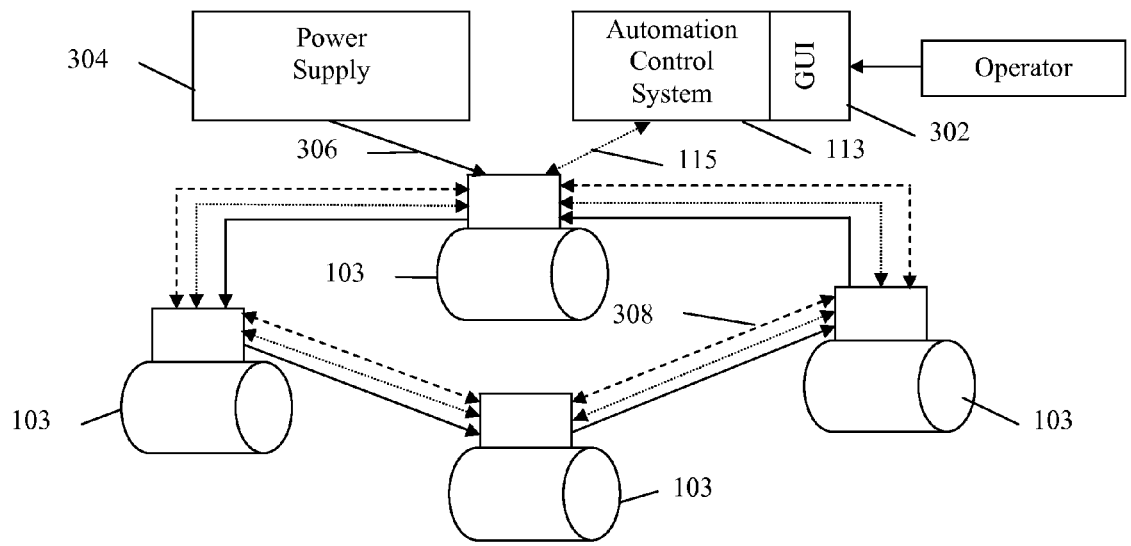
FIG. 4 schematically shows another embodiment of a wiring arrangement for a plurality of winches.

Referring now to FIGS. 3 and 4, which schematically show embodiments of the power and control connections that may be used for a group of winches in a flying rig system or other type of system, such as the winches used for the flying rig configurations or embodiments of FIG. 1 or 2. Each winch assembly 103 can, directly or indirectly, receive control instructions from an automation controller or control system 113 and send information and requests to the automation controller or control system 113 using control lines or wires 115. In addition, each winch assembly 103 can receive power from a power supply 304 using power lines or wires 306. Each winch assembly 103 is also in communication, i.e., can send and receive information and instructions, with one or more of the other winches 103 used in the flying rig system using communication lines or wires 308. In one exemplary embodiment, control lines 115 and communication lines 308 can be combined into a single line or cable and can use the same wires or conductors to communicate signals, instructions and information. However, in another exemplary embodiment, the communication lines 308 and the control lines 115 may use different types of wires or conductors or the same types of wires or conductors to communicate signals, instructions and information, either in the same cable or in different cables. In still another embodiment, power lines 306 may be combined with one or both control lines 115 and communication lines 308 into a single cable configuration.

The arrangement of control lines 115 may include individual cables or wires connecting each winch assembly 103 to the automation controller 113 in a star arrangement (as shown in FIG. 3) or in a daisy chain, ring, mesh, daisy chain loop, token ring, or token star arrangement. In another exemplary embodiment, control lines 115 may connect each winch assembly 103 to the automation controller 113 through a combination of two of more of daisy chain, star, ring, mesh, daisy chain loop, token ring, or token star arrangements. The arrangement shown in FIG. 4 is one wherein the automation controller 113 is connected to a first winch 103, the first winch is then connected to a second winch 103, etc., until the last winch 103 in the arrangement is connected back to the first winch 103. By using the arrangement of FIG. 4, a control connection between the automation control system 113 and each winch 103 can be maintained in the event that one of the control lines 115 connected between winches 103 is damaged or broken. Similarly, the arrangement of the power lines 306 and the communication lines 308 may use the same arrangement as the control lines 115 or may be arranged differently from control lines 115. In one exemplary embodiment, one or both of control lines 115 and communication lines 308 can be replaced by wireless communication techniques for the transmission of signals, instructions and information.

The automation controller or control system 113 can include one or more microprocessors to execute one or more control programs or algorithms associated with control of the winches 103 and a graphical user interface (GUI) or human-machine interface (HMI) 302 to enable an operator to interact with the automation controller 113. In one embodiment, the automation controller 113 may also be integrated into or operate as a larger control system that can provide additional control operations or instructions to other components, e.g., lifts, chain hoists, audio devices, lighting devices, and/or video devices that may be used in conjunction with the winches 103. In another embodiment, the automation controller 113 can communicate with the winches 103 or other components using any suitable communication protocol such as 0-10 V (volt), modbus, profibus, artnet, BMS, ether cat, DMX, Ma-Net, K-Bus, serial, Ethernet, TCP and/or UDP.

The automation controller 113 can provide basic system-wide instructions applicable to each of the winches 103, e.g., a start or execute command or emergency stop (estop) command, using control lines 115. The automation controller 113 can also provide control instructions to individual winches 103 based on the executed control program or based on a specific operator input into the GUI 302. In addition, the automation controller 113 can receive information from the winches 103 regarding the operation of the winches 103 and can provide the winch operational information to the operator through the GUI 302.

Figure 5:
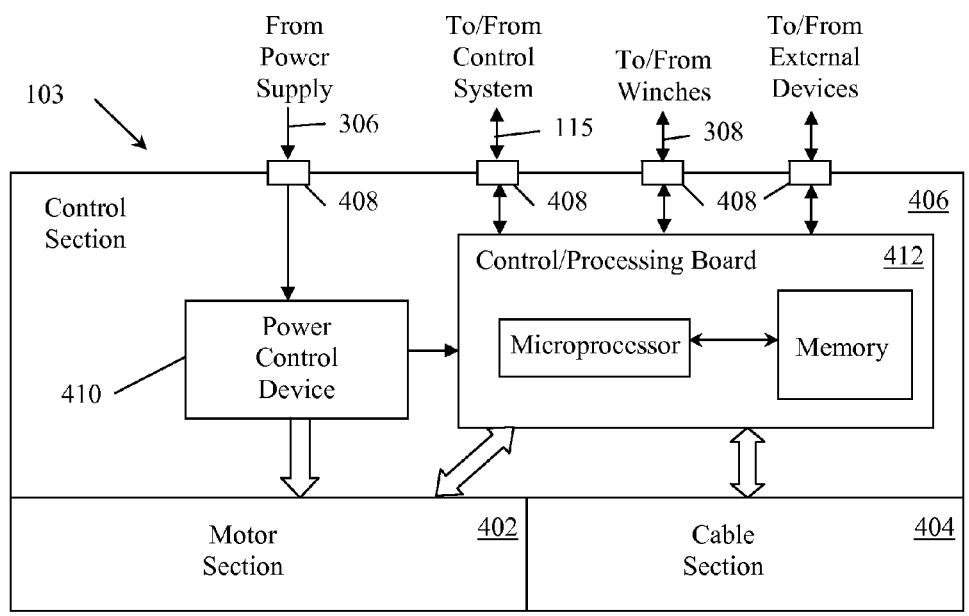
FIG. 5 schematically shows an embodiment of a winch.

As shown in FIG. 5, each winch 103 used in a flying rig system can include a motor section 402, a cable section 404 and a control section 406. The motor section 402 includes the motor and related components and the cable section 404 includes the cable reel or drum and related components. The control section 406 can include one or more connection points 408 providing input and/or output connections for one or more of the control lines 115, power lines 306, communication lines 308 and external devices, such as portable memory devices (e.g., memory cards or flash drives) or operator interfaces (e.g., joystick, keyboard, mouse or monitor).

The control section 406 can include a power control device 410 to receive power from the power lines 306 and provide power to the motor, the control board (and control board components) and any other device in the winch 103 that has a power requirement. In one embodiment, the power control device can include one or more transformers. A control/processing board or device 412 is included in the control section 406 and includes one or more microprocessors and one or more memory devices. In one embodiment, the control/processing board 412 can exchange, i.e., send and receive, data, signals, instructions and/or information with the automation controller 113, the other control/processing boards 412 of the other winches 103 and/or any connected external devices.

In one exemplary embodiment, the microprocessor(s) of the control/processing board 412 can execute one or more control programs or algorithms stored in the memory device(s) associated with the winch 103. The control program or algorithm executed by the control/processing board 412 can provide the necessary control instructions to control operation of the components of the winch 103. For example, the control/processing board 412 can provide instructions or commands to extend or retract cable, to control the speed at which the cable is extended or refracted, to turn on outputs, to send analog signals, to monitor incoming signals or inputs and/or to trigger audio commands. In addition, the control/processing board 412 can receive signals, instructions and/or information from the automation controller 113 and/or the other control/processing boards 412 of the other winches and then can generate the appropriate response instructions or commands for the winch 103 based on the received input. By having information on the operation of the other winches 103, the control/processing board 412 can generate the appropriate instructions or commands for the winch 103 to provide for smooth operation of the system.

More specifically, the control programs or algorithms for each control/processing board 412 can include instructions on how the winch 103 is to coordinate with the actions of the automation control system 113 or the other winches 103 to achieve desired system actions. For example, one control/processing board 412 can be designated as a "master" board and the remaining control/processing boards 412 can be "slave" boards. The start of an action by the "slave" boards can be synchronized to the start of an action by the "master" board. If an non-synchronous start is required, the position of the "slave" winches can be monitored in relation to the position of the "master" winch to determine when to start an action.

In one embodiment, the coordinated control of the motorized winches occurs through the exchange of signals between control/processing boards to enable the other motorized winches to know the action(s) being taken by an individual motorized winch. For example, to change the vertical position of a load support or frame, several of the control/processing boards 412 all have to generate extend or retract commands substantially simultaneously for a smooth change in the vertical position to occur. To change the horizontal position of a load support or frame, one or more of the control/processing boards 412 have to generate extend commands at substantially the same time as one or more other control/processing boards 412 are generating retract commands. Furthermore, more complicated system actions, e.g., a simultaneous change in both vertical and horizontal position, may require the generation of speed control signals in addition to extend/retract control signals. In addition, in the event of a failure in the motor section 402 or the cable section 404 of one of the winches 103, the control/processing boards 412 for the other winches can substantially simultaneously execute corresponding safety commands, e.g., emergency stop or e-stop commands.

In an exemplary embodiment, the control section 406 can include one or more sensors to measure operating conditions or parameters in at least one of the motor section 402, the cable section 404 or the control section 406. Some examples of operating conditions or parameters that can be measured can include motor temperature, motor current, available cable, distance of cable extended from the reel, cable load or weight (load cell), cable angle, cable g-force or acceleration (accelerometer), direction of motor (or reel) rotation, speed of motor (or reel) rotation, or control/processing board temperature. The sensors can then transmit the measured operational data to the control/processing board 412. The control/processing board 412 can then use this information during the execution of the control program and algorithm to determine and/or generate the appropriate commands. In one embodiment, the control/processing board 412 can also transmit the sensor data to the other control/processing boards 412 and/or the automation control system 113 to be used by the control programs or algorithms of the other control/processing boards 412 and/or the automation control system 113.

In another exemplary embodiment, if one of the control/processing boards 412 should fail or become non-responsive, the control of that winch 103 can be transferred or distributed to one or more of the other control/processing boards 412. In one embodiment, the transfer of control from a failed control/processing board 412 can occur automatically to a designated control/processing board (automatic fail-over). In another embodiment, the operator can be notified of the failure of the control/processing board 412 and can select a control/processing board 412 to take over the operations. The designated (or selected) control/processing board 412 can receive the inputs for the failed control/processing board, generate the appropriate control signals using a copy of the control program or algorithm for the failed control/processing board and then transmit the corresponding control instructions back to the winch 103 with the failed control/processing board 412 for implementation or execution.

In one exemplary embodiment, a portable memory device can be connected to the control/processing board 412 to provide a control program or algorithm for execution by the microprocessor different from the one stored in the memory device. The new control program or algorithm may be required in response to a new location for the winch 103 that requires different commands to be generated corresponding to the new location of the winch 103 or in response to a change to the desired actions to be performed by the winch 103. The new control program or algorithm can be loaded or stored in the memory device of the control/processing board 412 for execution by the microprocessor or the new control program or algorithm can be executed directly from the portable memory device.

In yet another exemplary embodiment, the control algorithm(s) stored in the winch 103 can be executed in response to receiving a particular command or signal from automation control system 113. A command or signal from automation control system 113 could trigger the execution of a control algorithm in the winch 103 that would result in several individual actions being taken by the winch 103. For example, a sequence of actions taken by the winch 103 in response to a signal from the automation control system 113 could be to coordinate with other control/processing boards 412, deploy/retract cable and stop deploying/retracting cable after a predetermined time period.

The present application contemplates methods, systems and program products on any machine-readable media for accomplishing its operations. The embodiments of the present application may be implemented using an existing computer processor, or by a special purpose computer processor for an appropriate system, or by a hardwired system.

Embodiments within the scope of the present application include program products comprising machine-readable media for carrying or having machine-executable instructions or data structures stored thereon. Machine-readable media can be any available non-transitory media that can be accessed by a general purpose or special purpose computer or other machine with a processor. By way of example, machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Although the figures herein may show a specific order of method steps, the order of the steps may differ from what is depicted. Also, two or more steps may be performed concurrently or with partial concurrence. Variations in step performance can depend on the systems chosen and on designer choice. All such variations are within the scope of the application. Likewise, software implementations could be accomplished with standard programming techniques with rule based logic and other logic to accomplish the various connection steps, processing steps, comparison steps and decision steps.

While the exemplary embodiments illustrated in the figures and described herein are presently preferred, it should be understood that these embodiments are offered by way of example only. Other substitutions, modifications, changes and omissions may be made in the design, operating conditions and arrangement of the exemplary embodiments without departing from the scope of the present application. Accordingly, the present application is not limited to a particular embodiment, but extends to various modifications that nevertheless fall within the scope of the appended claims. It should also be understood that the phraseology and terminology employed herein is for the purpose of description only and should not be regarded as limiting.

It is important to note that the construction and arrangement of the present application as shown in the various exemplary embodiments is illustrative only. Only certain features and embodiments of the invention have been shown and described in the application and many modifications and changes may occur to those skilled in the art (e.g., variations in sizes, dimensions, structures, shapes and proportions of the various elements, values of parameters (e.g., temperatures, pressures, etc.), mounting arrangements, use of materials, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A system comprising:
a plurality of winches;
each winch of the plurality of winches comprising:
a motor;
a cable reel; and
a control board, the control board comprising a microprocessor and a memory device, the memory device storing a computer program executable by the microprocessor to generate a plurality of commands to control operation of the winch; and
the control board of a first winch of the plurality of winches being operable to generate the plurality of commands to control operation of a second winch of the plurality of winches in response to the failure of the control board of the second winch of the plurality of winches.

2. The system of claim 1 further comprising an automation control system in communication with the plurality of winches, the automation control system comprising a second computer program executable by a second microprocessor to generate control instructions for the plurality of winches.

3. The system of claim 2 wherein each winch of the plurality of winches comprises a connection point in communication with the automation control system to receive the generated control instructions from the automation control system.

4. The system of claim 1 wherein the plurality of winches are connected using wireless communication techniques.

5. The system of claim 1 wherein each winch of the plurality of winches comprises a connection point in communication with at least one other winch of the plurality of winches to exchange data with the at least one other winch of the plurality of winches.

6. The system of claim 1 wherein each winch comprises a connection point to receive a portable memory device.

7. The system of claim 6 wherein the portable memory device comprises a second computer algorithm executable by the microprocessor to generate a second plurality of commands to control operation of the motor and cable reel to extend or retract cable.

8. The system of claim 6 wherein the portable memory device comprises at least one of a flash drive or a memory card.

9. The system of claim 1 further comprising:
a communication network connected to each winch of the plurality winches to permit communication between the plurality of winches; and
the generated plurality of commands to control operation of the second winch being transmitted from the control board of the first winch to the second winch over the communication network.

10. The system of claim 1 wherein the control board of the first winch automatically generates the plurality of commands to control operation of a second winch in response to the failure of the control board of the second winch.

11. A system comprising:
an automation control system;
a plurality of winches, each winch of the plurality of winches comprising:
a motor; and
a control board, the control board comprising a microprocessor and a memory device, the memory device storing a computer program executable by the microprocessor to generate a plurality of commands to control operation of the motor in response to receiving an operational command from the automation control system;
a communication network connecting the plurality of winches and the automation control system, the communication network being operable to permit communication between the winches of the plurality of winches and communication between the automation control system and the plurality of winches;
the automation control system being operable to permit a transfer of control of a first winch of the plurality of winches with a failed control board to one or more control boards of one or more second winches of the plurality of winches; and
the one or more control boards of the one or more second winches being operable to receive inputs for the first winch over the computer network and provide control commands to the first winch over the computer network.

12. The system of claim 11 wherein the automation control system comprises a second computer program executable by a second microprocessor to generate the operational commands for the plurality of winches.

13. The system of claim 12 wherein each winch of the plurality of winches comprises a connection point in communication with the automation control system to receive the generated operational commands from the automation control system.

14. The system of claim 11 wherein each winch of the plurality of winches comprises a connection point in communication with at least one other winch of the plurality of winches to receive data from the at least one other winch of the plurality of winches.

15. The system of claim 11 wherein each winch of the plurality of winches comprises a connection point to receive a portable memory device.

16. The system of claim 15 wherein the portable memory device comprises a second computer program executable by the microprocessor to generate a second plurality of commands to control operation of the motor in response to receiving an operational command from the automation control system.

17. The system of claim 15 wherein the portable memory device comprises at least one of a flash drive or a memory card.

18. The system of claim 11 wherein at least one winch of the plurality of winches comprises a first computer algorithm and at least one other winch of the plurality of winches comprises a second computer algorithm and an operational command from the automation control system results in the microprocessor of the at least one winch executing the first computer algorithm to rotate the motor of the at least one winch in a first direction and the microprocessor of the at least one other winch executing the second computer algorithm to rotate the motor of the at least one other winch in a second direction opposite the first direction.

19. The system of claim 11 wherein the automation control system transfers control of the first winch to the one or more control boards of the one or more second winches in response to an operator input after notifying the operator of a failure of the control board of the first winch.

20. The system of claim 11 wherein the automation control system automatically transfers control of the first winch to the one or more control boards of the one or more second winches in response to detecting a failure of the control board of the first winch.

* * * * *